Sept. 20, 1932. J. M. HJERMSTAD 1,878,142
SOIL PULVERIZER
Filed May 7, 1928 3 Sheets-Sheet 1
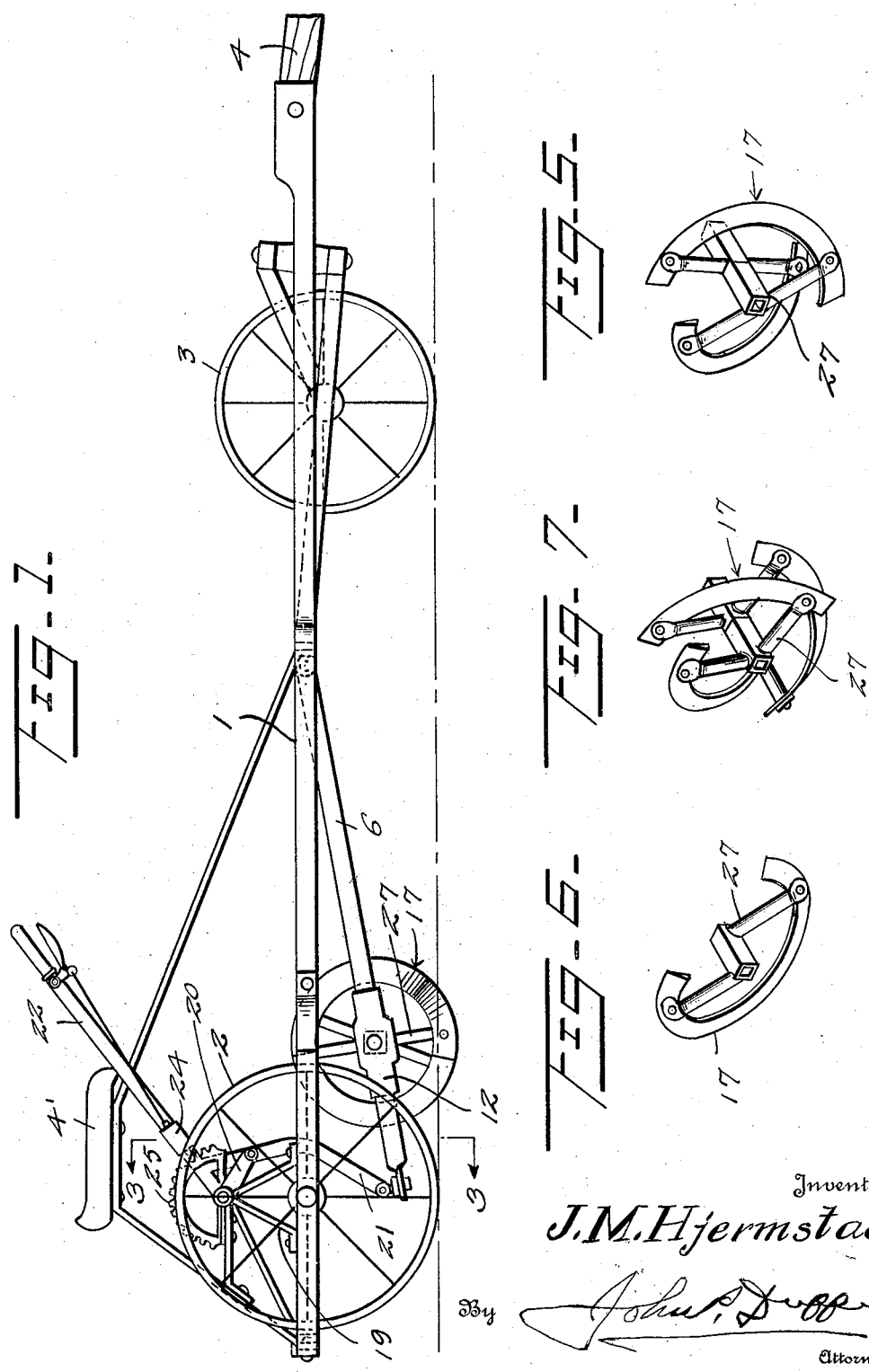
Inventor
J. M. Hjermstad
By John P. Duffie
Attorney

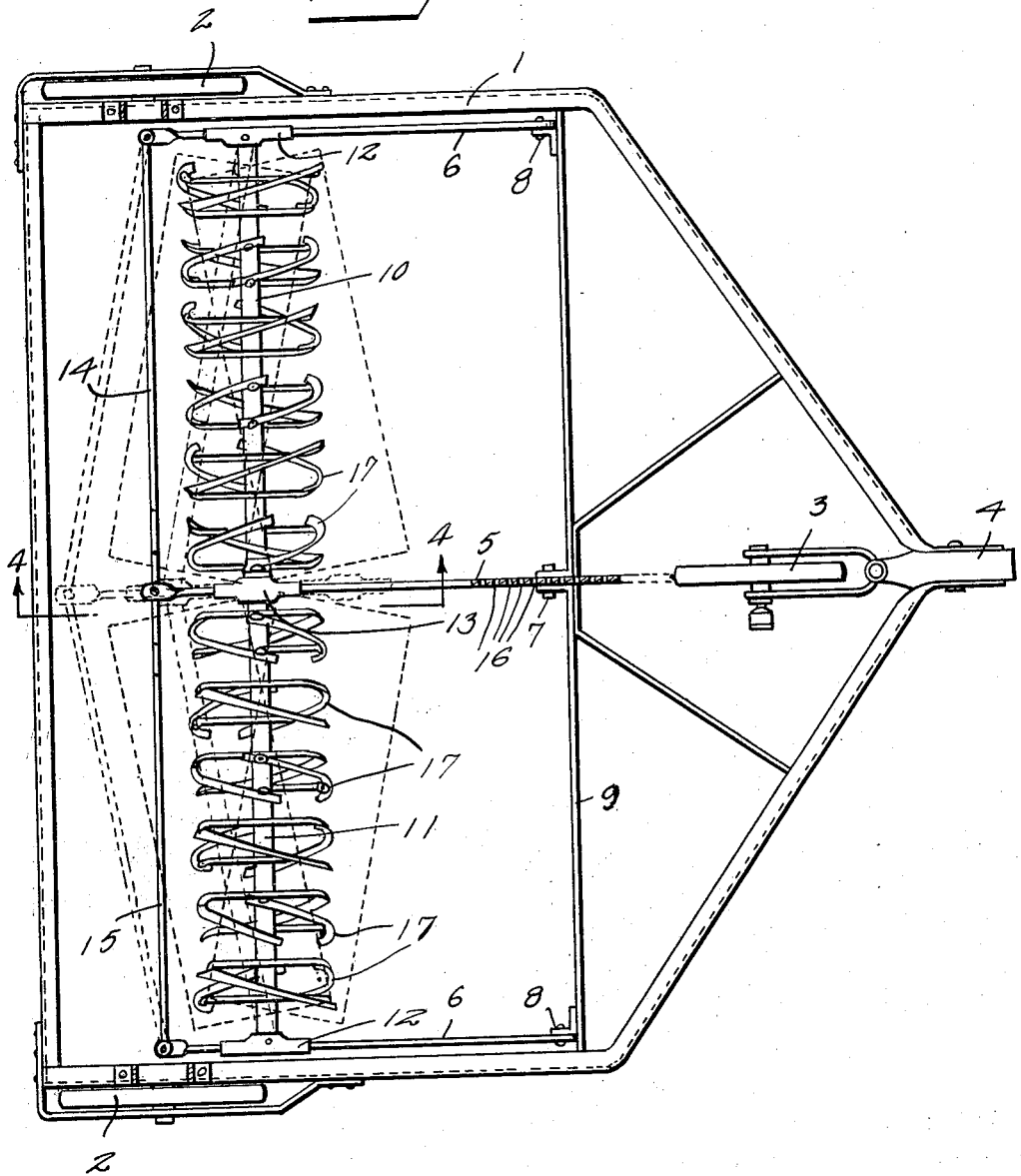

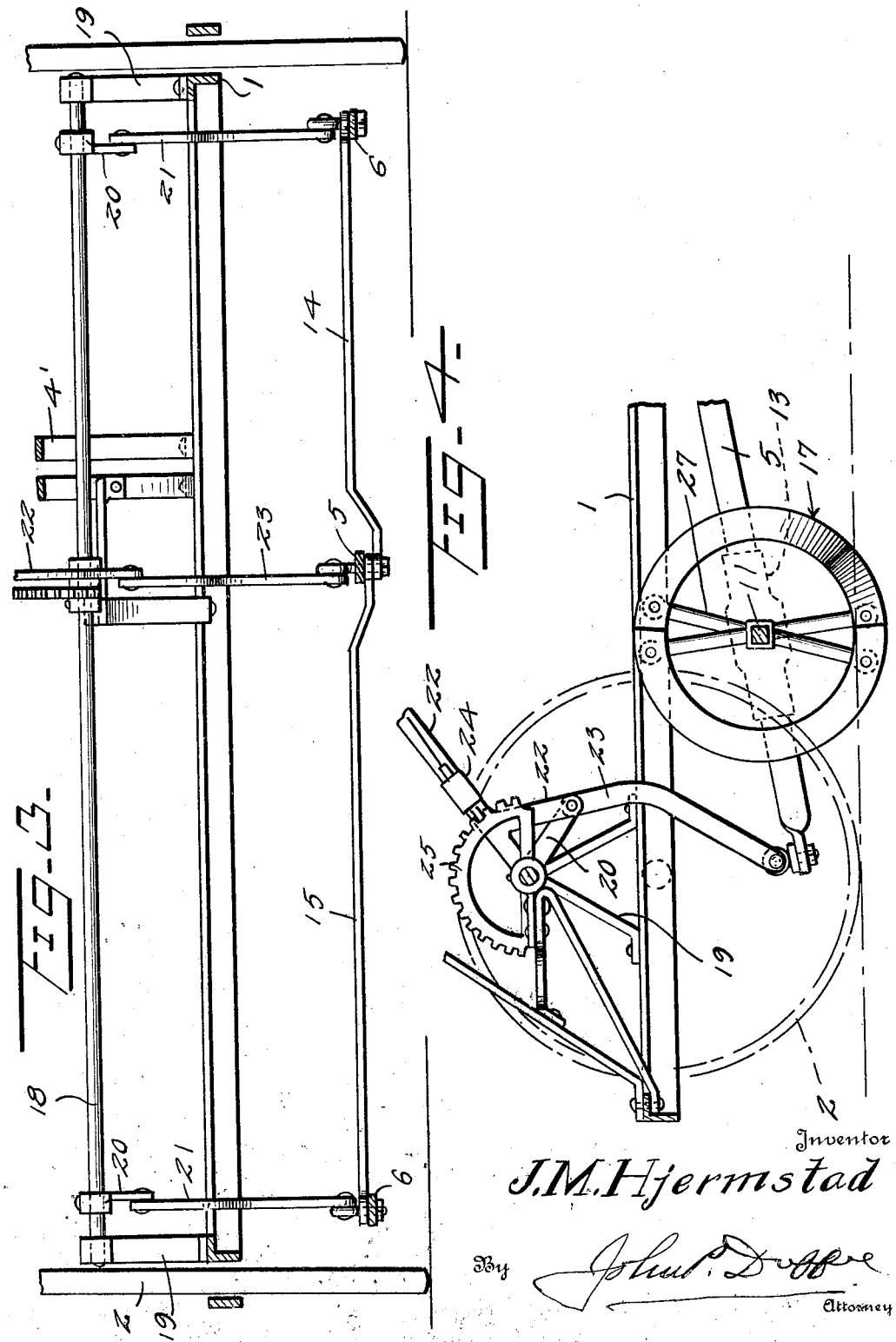

Patented Sept. 20, 1932

1,878,142

UNITED STATES PATENT OFFICE

JOHN M. HJERMSTAD, OF RED WING, MINNESOTA

SOIL PULVERIZER

Application filed May 7, 1928. Serial No. 275,634.

This invention relates to new and useful improvements in soil pulverizers.

One object of my invention is to provide a machine for pulverizing soil by circular spiral cutting blades mounted on radial arms projecting from central shafts and forming one or more series of spirals which revolve over and cut into the earth.

A further object of my invention is to provide a machine of the character specified, in which the blades may be easily and quickly removed or replaced by new blades.

A still further object of my invention is to provide a construction in which the blades are pitched to the right and left to prevent side draft and whereby the pulverized soil is thrown in both directions.

Still another object of my invention is to provide a soil pulverizer in which the spiral blades may be raised or lowered to any desired depth or disposed at a forward or rearward inclination.

With the foregoing and other objects in view that will appear as the nature of my invention is better understood, the same consists in the novel features of construction, combination and arrangement of parts illustrated in the accompanying drawings and more particularly pointed out in the appended claims.

In the accompanying drawings, which are for illustrative purposes only and are therefore not drawn to scale:

Figure 1 is a side elevational view of the soil pulverizer;

Figure 2 is a plan view of the same;

Figure 3 is a vertical transverse section, taken on line 3—3 of Figure 1.

Figure 4 is a central vertical longitudinal section, taken on line 4—4 of Figure 2.

Figure 5 is an enlarged detail perspective view of a single spiral cutting blade.

Figure 6 is a similar view of a double spiral cutting blade.

Figure 7 is a detail perspective view of a triple spiral cutting blade.

Referring to the drawings for a more particular description of my invention and in which drawings like parts are designated by like reference characters throughout the several views, my machine comprises the main frame 1, rear supporting wheels 2, front swivel supporting wheel 3, draft tongue 4 and seat 4' for the driver. The supporting frame for the spiral cutting blades and associated parts, comprises the parallel longitudinally disposed central and end bars 5 and 6, pivoted at their front ends, as at 7 and 8, to the cross beam 9 of the main frame.

In carrying out my invention, the supporting shaft for the spiral cutting blades hereinafter described, is made in two corresponding sections 10 and 11 whose outer ends are journaled in self-alining ball bearings 12 carried by the rear ends of the bars 6, and whose inner ends are journaled in the self-alining center bearing 13 at the rear end of the central bar 5. The rear ends of the bars 5 and 6 are connected together by the pivoted transverse brace rods 14 and 15 and the front end of the bar 5 is provided with a longitudinal series of openings 16, whereby it may be adjusted forwardly or rearwardly, as desired. By mounting the spiral cutting blades 17 in position in the manner shown and described, the same may be adjusted at either a forward or rearward inclination, as indicated in dotted lines in Figure 1, or may be raised or lowered into the ground to the desired depth.

The spiral cutting blades may be raised or lowered by the following mechanism: A rock shaft 18 is mounted in suitable bearings 19 on the rear end of the main frame 1 and this shaft is provided at its ends with crank arms 20, which are connected through the medium of the vertical links 21, with the rear ends of the bars 6. The rock shaft 18 is also provided at a suitable point intermediate its ends, with an actuating lever 22 which is connected by means of the vertical link 23 with the rear end of the bar 5. Lever 22 is provided with a hand operated pawl 24 adapted to co-act with the toothed segmental rack 25 in holding the lever in adjusted position.

The cutting blades may be in the form of a single member or unit, as illustrated in Figure 5, or comprise two oppositely pitched or inclined members, as illustrated in Figure 6. Again, the cutting blades may consist of three members or units, as shown in Figure 7. In all forms, however, the cutting blades are secured to the outer ends of the radial supporting arms 26 carried by the spiders 27, which are removably mounted on the shaft sections 10 and 11.

From the foregoing description taken in connection with the drawings, it is thought that the construction, operation and advantages of my invention will be readily understood without requiring a more extended explanation.

Various changes in the form, proportions and minor details of construction may be resorted to without departing from the principles or sacrificing any of the advantages of my invention as defined in the appended claims.

Having described my invention, what I claim as new and desire to secure by Letters Patent, is:

1. A soil pulverizer comprising a frame, wheels supporting the frame, cross bars carried by the frame, side bars pivoted to the cross bars, an intermediate bar adjustably connected with the cross bars, bearing members carried by the side bars and intermediate bar, shaft sections journaled in the bearing members, and soil engaging elements carried by the shaft sections.

2. A soil pulverizer comprising a wheeled frame including a cross member, side bars and an intermediate bar pivotally connected to the cross member, the connection between the intermediate bar and said cross member providing for the longitudinal adjustment of the intermediate bar, compensating bearings carried by the side bars and intermediate bar, shaft sections journaled in said bearings, earth working means mounted on the shaft sections, and tie bars pivotally connecting the side bars with said intermediate bar.

3. In a soil pulverizer, a shaft angularly adjustable relative to the line of draft, a plurality of revoluble soil pulverizing elements removably mounted on said shaft and having contact with the ground, each element comprising a hub to receive said shaft, arms radiating from the hub and an arcuate blade attached to the arms and disposed spirally of the hub, said blade being of low pitch, whereby that portion thereof in engagement with the ground extends substantially in the direction of the line of draft.

4. In a device of the character described, a revolving pulverizing element having rolling contact with the ground and turning on an axis disposed at an angle to the line of draft, said element comprising a hub member, arms radiating therefrom and a plurality of arcuate blades, each secured to a plurality of said arms, said blades being disposed in succession spirally of the hub member, each blade acting successively to cut into the soil in substantially the same direction as the line of draft.

In testimony whereof he affixes his signature.

JOHN M. HJERMSTAD.